(12) United States Patent
Lyu et al.

(10) Patent No.: US 11,294,229 B2
(45) Date of Patent: Apr. 5, 2022

(54) BACKLIGHT MODULE AND DISPLAY DEVICE

(71) Applicants: BEIJING BOE OPTOELETRONICS TECHNOLOGY CO., LTD., Beijing (CN); BOE TECHNOLOGY GROUP CO., LTD., Beijing (CN)

(72) Inventors: Hongliang Lyu, Beijing (CN); Boning Wang, Beijing (CN); Yufei Liu, Beijing (CN); Yufeng Du, Beijing (CN)

(73) Assignees: Beijing BOE Optoelectronics Technologyy Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 140 days.

(21) Appl. No.: 16/333,881

(22) PCT Filed: Jun. 13, 2018

(86) PCT No.: PCT/CN2018/090926
§ 371 (c)(1),
(2) Date: Mar. 15, 2019

(87) PCT Pub. No.: WO2019/056810
PCT Pub. Date: Mar. 28, 2019

(65) Prior Publication Data
US 2020/0387031 A1  Dec. 10, 2020

(30) Foreign Application Priority Data

Sep. 20, 2017 (CN) .......................... 201721215198.0

(51) Int. Cl.
*G02F 1/13357* (2006.01)
*F21V 29/70* (2015.01)
*F21V 29/85* (2015.01)

(52) U.S. Cl.
CPC ........ *G02F 1/133605* (2013.01); *F21V 29/70* (2015.01); *F21V 29/85* (2015.01); *G02F 1/133603* (2013.01); *G02F 1/133608* (2013.01)

(58) Field of Classification Search
CPC ......... G02F 1/133603; G02F 1/133605; G02F 1/133608; F21V 29/70; F21V 29/85
(Continued)

(56) References Cited

U.S. PATENT DOCUMENTS

2012/0249923 A1* 10/2012 Kono ................... G02B 6/0055
349/62
2013/0223094 A1 8/2013 Yang et al.
(Continued)

FOREIGN PATENT DOCUMENTS

CN 104832837 A 8/2015
CN 106094309 A 11/2016
(Continued)

OTHER PUBLICATIONS

International Search Report and Written Opinion for International Appl. No. PCT/CN2018/090926, dated Sep. 20, 2018.

*Primary Examiner* — Evan P Dzierzynski
(74) *Attorney, Agent, or Firm* — The Webb Law Firm

(57) ABSTRACT

The present disclosure relates to a backlight module and a display device. The backlight module includes: a heat sinking plate; a mold frame fixed to the heat sinking plate and surrounding a region on the heat sinking plate; and a reflection plate disposed in the region surrounded by the mold frame such that the reflection plate can be moved relative to the heat sinking plate.

15 Claims, 2 Drawing Sheets

(58) Field of Classification Search
USPC ........................................................ 362/97.1
See application file for complete search history.

(56) References Cited

U.S. PATENT DOCUMENTS

| | | | |
|---|---|---|---|
| 2014/0002969 A1* | 1/2014 | Hwang | G06F 1/1637 |
| | | | 361/679.01 |
| 2015/0247967 A1* | 9/2015 | Horiuchi | G02F 1/133608 |
| | | | 362/611 |
| 2019/0049794 A1* | 2/2019 | Liu | G02B 6/0055 |

FOREIGN PATENT DOCUMENTS

| | | |
|---|---|---|
| CN | 106154615 A | 11/2016 |
| CN | 106439607 A | 2/2017 |
| CN | 207301563 U | 5/2018 |

* cited by examiner

BACKLIGHT MODULE AND DISPLAY DEVICE

CROSS-REFERENCE TO RELATED APPLICATIONS

This application is a National Stage of International Application No. PCT/CN2018/090926, filed on Jun. 13, 2018, which claims priority to Chinese Patent Application No. 201721215198.0, filed on Sep. 20, 2017. Both of the aforementioned applications are hereby incorporated by reference in their entireties.

TECHNICAL FIELD

The present disclosure relates to the field of display technology.

BACKGROUND

With advances in degree of intelligence of electronic products and the increase in their applications, users have higher demands for size and brightness of a display screen in the electronic products, especially the display screens for mobile terminals.

SUMMARY

In one aspect of the present disclosure, a backlight module is provided, comprising a heat sinking plate; a mold frame which is fixed to the heat sinking plate and surrounds a region on the heat sinking plate; and a reflection plate disposed in the region surrounded by the mold frame such that the reflection plate can move relative to the heat sinking plate.

In some embodiments according to the present disclosure, there may be no adhesive between the heat sinking plate and the reflection plate.

In some embodiments according to the present disclosure, the heat sinking plate may be made of natural graphite, synthetic graphite, copper foil, aluminum foil or a thermally conductive silicone film.

In some embodiments according to the present disclosure, the inner side wall of the mold frame may be provided with an engaging portion, and the reflection plate may be engaged with the engaging portion.

In some embodiments according to the present disclosure, the snap portion may comprise a plurality of latching slots, and the reflection plate may comprise a plurality of protruding portions, and each of the protruding portions may be engaged with a corresponding latching slot.

In some embodiments according to the present disclosure, a bottom surface of the mold frame may be provided with an adhesive layer, and the heat sinking plate may be fixed to the mold frame by the adhesive layer.

In some embodiments according to the present disclosure, a width of the adhesive layer may be no greater than a width of the bottom surface of the mold frame.

In some embodiments according to the present disclosure, the adhesive layer may be a double-sided tape of a rectangular shape.

In some embodiments according to the present disclosure, the backlight module may further comprise a light source disposed on a side of the reflection plate away from the heat sinking plate.

In some embodiments according to the present disclosure, an orthographic projection of the light source on the heat sinking plate may be located within an orthographic projection of the reflection plate on the heat sinking plate.

In some embodiments according to the present disclosure, there may be a gap between the light source and the reflection plate.

In some embodiments according to the present disclosure, the backlight module may further comprise a light guide plate on a side of the reflection plate away from the heat sinking plate.

In some embodiments according to the present disclosure, the backlight module may further comprise an optical film layer located on a side of the light guide plate away from the reflection plate.

In some embodiments according to the present disclosure, the heat sinking plate may be directly bonded to the mold frame.

According to another aspect of the present disclosure, there is provided a display device comprising the above backlight module according to the present disclosure.

BRIEF DESCRIPTIONS OF THE DRAWINGS

The above and/or additional aspects and advantages of the present disclosure will become clear and readily understood from the following description of the embodiments with reference to the drawings.

DETAILED DESCRIPTIONS OF THE EMBODIMENTS

Figure 1:
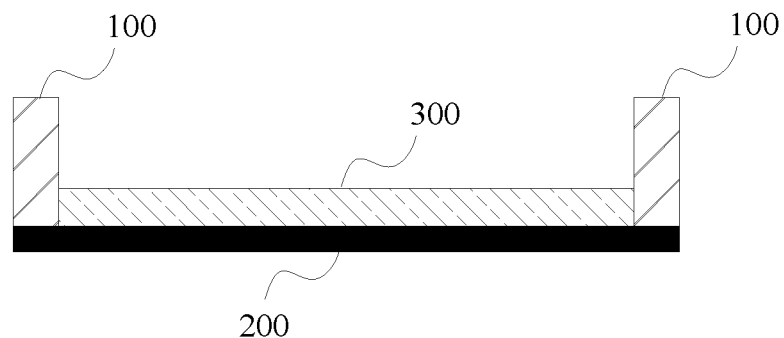
FIG. 1 is a schematic structural diagram of a backlight module according to an embodiment of the present disclosure.

The embodiments of the present disclosure are described in detail below, and the examples of the embodiments are illustrated in the drawings. The same or similar reference numerals are used to refer to the same or similar elements or elements having the same or similar functions. The embodiments described below with reference to the accompanying drawings are intended to be illustrative only, and are not to be construed as a limitation of the present disclosure.

The present disclosure is based on the discovery and recognition of the following facts and problems by the inventors:

The inventors discover that the current backlight modules generally have optical defects such as wrinkles and Newton rings caused by the warping of the reflection plate in the backlight module. The inventors have conducted in-depth research and a large number of experiments, and find out that the warping of the reflection plate is mainly caused by stress produced by inconsistency in flatness between the heat sinking film and the reflection plate, and the shrinkage/expansion of the heat sinking film and the reflection plate is inconsistent when the temperature changes. As mentioned above, in order to meet the user's demand for the size and brightness of the display screen, the number of backlight LEDs is increasing. At the same time, as the resolution of the display device continues to increase, the power consumption of the LCD driving chip and the driving circuit is also increasing. The backlight LED and the LCD driving chip of the liquid crystal display device are generally designed to be on the same side, and the heat dissipated by them will have a superposition effect. The above superposition effect further exacerbates the degree of warping between the heat sinking film and the reflection plate. As described above, the number of LEDs is increased in order to increase the display brightness of the display device, so the above problem is difficult to be solved by reducing the number of LEDs. At present, in the existing liquid crystal device, a heat sinking film is disposed in the backlight module to improve the heat dissipating effect, and the heat sinking film is directly attached to the reflection plate by a double-sided adhesive tape. Although such arrangement can achieve a good heat dissipation effect, the damage of the LED and the driving chip caused by the heat superposition is alleviated, but the optical defects such as wrinkles and Newton rings caused by the warping of the reflection plate cannot be alleviated. The inventors have found that in the above arrangement, the heat sinking film and the reflection plate are closely adhered to each other. Therefore, when the reflection plate and the heat sinking film are expanded and deformed, the warping of the reflection plate is intensified, resulting in the increase of optical defects such as wrinkles, Newton rings, and the like.

In one aspect of the present disclosure, the present disclosure provides a backlight module. According to an embodiment of the present disclosure, referring to FIG. 1, the backlight module includes: a mold frame 100, a heat sinking plate 200, and a reflection plate 300. According to an embodiment of the present disclosure, the heat sinking plate 200 may be fixed to the mold frame 100 (e.g. bonded to the mold frame 100) and form a box-shaped structure with the mold frame 100. That is, the heat sinking plate 200 includes an area surrounded by the mold frame 100. According to an embodiment of the present disclosure, the reflection plate 300 is disposed in the box-shaped structure (for example, the reflection plate 300 is disposed in the above-described region of the heat sinking plate 200), and the reflection plate 300 may move relative to the heat sinking plate 200. Therefore, the backlight module has at least one of the following advantages: the heat sinking plate is not bonded to the reflection plate so that warping of the reflection plate is avoided, and the optical defects such as wrinkles and Newton rings are prevented from happening; the reflection plate is disposed in the box-shaped structure, that is, the reflection plate is disposed only in the above region of the heat sinking plate 200 and no longer extends under the mold frame, so that the thickness of the backlight module can be reduced, and the backlight module is lighter and thinner; the box-shaped structure can be used as an integral supporting structure of the backlight module.

Figure 6:
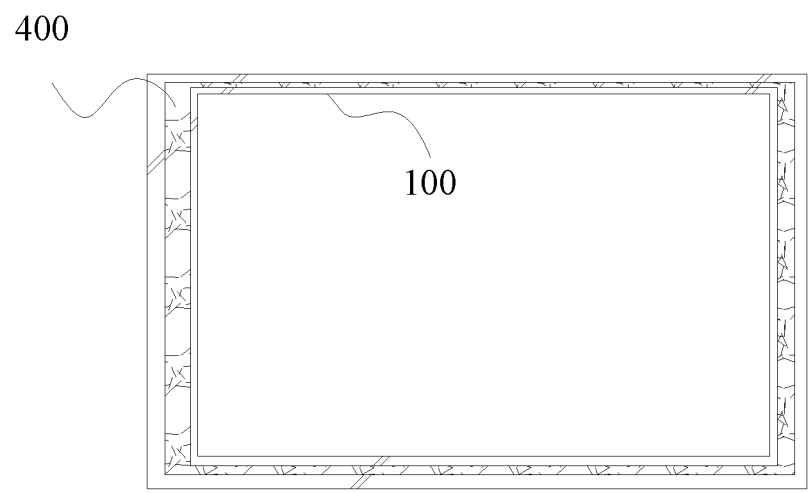
FIG. 6 shows a vertical view of a portion of a structure of a backlight module according to an embodiment of the present disclosure.

For ease of understanding, the above-mentioned box-shaped structure and the arrangement of the heat sinking plate and the reflection plate are described in detail below:

According to an embodiment of the present disclosure, referring to FIG. 6, the mold frame 100 may be in the shape of a rectangle, and the bottom of the mold frame 100 is fixed (e.g., bonded) to the heat sinking plate, that is, a box-shaped structure may be formed with the heat sinking plate 200 as a bottom surface and the mold frame 100 as an annular frame (side walls). The inner side walls of mold frame 100 and the heat sinking plate 200 define an accommodating space of the box-shaped structure. That is to say, a region on the heat sinking plate 200 is defined by the mold frame 100, and the reflection plate 300 is placed in the accommodating space of the box-shaped structure and stacked on the bottom surface of the box-shaped structure formed by the heat sinking plate. That is, the reflection plate 300 is disposed in the above-described region of the heat sinking plate 200.

Figure 2:
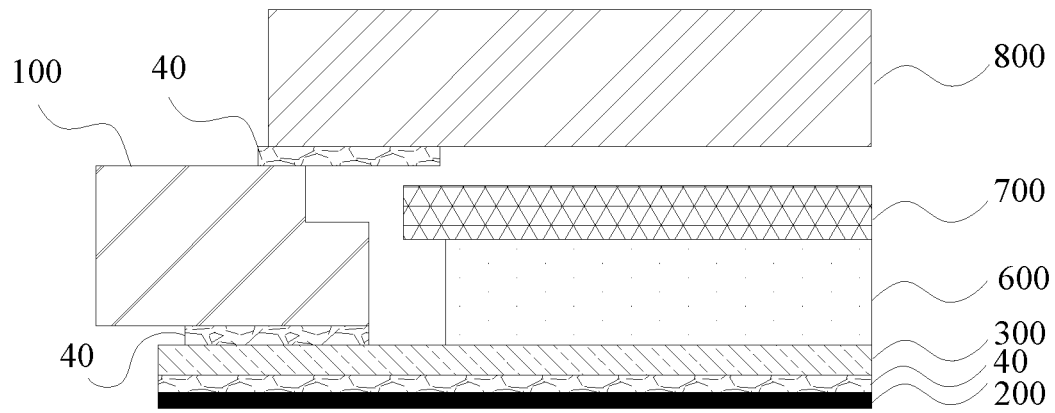
FIG. 2 is a schematic structural diagram of a backlight module in the related arts.
Figure 3:
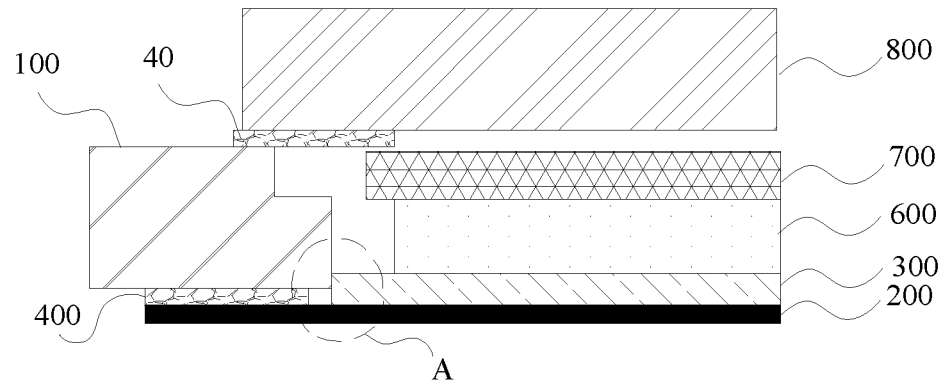
FIG. 3 is a schematic structural diagram of a backlight module according to an embodiment of the present disclosure.

Compared with the backlight module commonly used in the related art, the backlight module according to the embodiments of the present disclosure has the advantages of alleviating warping of the reflection plate, preventing optical defects such as wrinkles and Newton rings, and reducing the thickness of the module. Specifically, referring to FIG. 2, as described above, in the backlight module of the related art, the reflection sheet 300 and the heat sinking plate 200 are stacked on the bottom of the mold frame 100, and the reflection plate and the heat sinking plate form the bottom surface of the box-shaped structure of the backlight module. Therefore, the reflection plate 300 and the heat sinking plate 200 are tightly bonded by an adhesive layer 40. According to an embodiment of the present disclosure, referring to FIG. 3, since the reflection plate 300 is disposed inside the box-shaped structure, the heat sinking plate 200 is actually a member that realizes supporting of other structures of the backlight module. Therefore, it is only necessary to fix the heat sinking plate 200 to the bottom of the mold frame 100 by the adhesive layer 40. Therefore, it is possible to avoid providing an adhesive between the heat sinking plate 200 and the reflection plate 300. Thereby, the reflection plate is not bonded to the heat sinking plate by the adhesive, so that the reflection plate can move relative to the heat sinking plate. Even if the heat sinking plate 200 and the reflection plate 300 are heated and expanded, and the thermal expansion coefficients of the two plates are inconsistent, the reflection plate will not be warped by stress between the plates, and optical defects can be prevented. The heat sinking plate is not directly bonded to the reflection plate, the thickness of the backlight module is reduced and become lighter and thinner.

According to an embodiment of the present disclosure, the backlight module further includes a light guide plate 600 and an optical film layer 700. According to an embodiment of the present disclosure, the light guide plate 600 is disposed in the box-shaped structure and located on a side of the reflection plate 300 away from the heat sinking plate 200. Thereby, the performance of the backlight module can be further improved. The specific arrangement of the light guide plate 600 is not particularly limited, and those skilled in the art can made selection according to actual conditions. For example, according to an embodiment of the present disclosure, the light guide plate 600 may be engaged with the inner side wall of the mold frame 100. According to an embodiment of the present disclosure, the optical film layer 700 may also be disposed in the box-shaped structure and located on a side of the light guide plate 600 away from the reflection plate 300. Thereby, the performance of the backlight module can be further improved. According to an embodiment of the present disclosure, the specific type of the optical film layer 700 is not particularly limited, and those skilled in the art can made selection according to actual needs. For example, the optical film layer 700 may be a structure in which a plurality of film layers are stacked, or may be a composite film layer. The optical film layer 700 may specifically include an antireflection film, a prism film, a diffusion film, and the like to further improve the performance of the backlight module. According to the embodiment of the present disclosure, the specific arrangement of the optical film layer 700 is not particularly limited, and those skilled in the art can made selection according to actual needs. For example, it can be understood by those skilled in the art that since the liquid crystal module 800 needs to be disposed on the light emitting side of the backlight module (the side close to the optical film layer 700), the thickness of the light guide plate 600 and the optical film layer 700 can be designed such that they can be stacked in the box-shaped structure, and the upper portion is fixed by the liquid crystal module 800. Therefore, the optical film layer 700 and the light guide plate 600 can be stacked in order, and no adhesive connection is required.

According to the embodiment of the present disclosure, the specific type of material forming the heat sinking plate 200 is not particularly limited, as long as it provides the backlight module with a good heat dissipation function. For example, according to an embodiment of the present disclosure, the material forming the heat sinking plate 200 may be natural graphite, synthetic graphite, copper foil, aluminum foil, or a thermally conductive silicone film. Thereby, the heat dissipation performance of the heat sinking plate 200 can be improved, and the performance of the backlight module can be further improved.

According to an embodiment of the present disclosure, the fixing between the heat sinking plate 200 and the mold frame 100 is not particularly limited. As long as the box-shaped structure can be formed, and the heat sinking plate 200 and the mold frame 100 can be used to form a space for accommodating and supporting other structures. For example, according to a specific embodiment of the present disclosure, referring to FIG. 3 and FIG. 6, an adhesive layer 400 may be provided on the bottom surface of the mold frame 100, and the heat sinking plate 200 is bonded to the mold frame 100 by the adhesive layer 400. Thereby, the heat sinking plate 200 is closely bonded to the bottom surface of the mold frame 100, and the gap can be reduced to prevent light leakage. According to an embodiment of the present disclosure, the heat sinking plate 200 may be bonded to the bottom of the mold frame 100 by the adhesive layer 400, and the structure thus formed is a box-shaped structure. According to an embodiment of the present disclosure, the width of the adhesive layer 400 is not greater than the width of the bottom surface of the mold frame 100. Thereby, the adhesive layer 400 can be prevented from entering into the mold frame 100. According to the embodiment of the present disclosure, the specific type of the material forming the adhesive layer 400 is not particularly limited, and as long as bonding the bottom surface of the mold frame 100 to the adhesive layer 400. For example, according to an embodiment of the present disclosure, the adhesive layer 400 may be a double-sided tape. Specifically, a double-sided tape of the rectangle shape can be directly used as the adhesive layer 400. Thereby, the cost can be further reduced.

Figure 4:
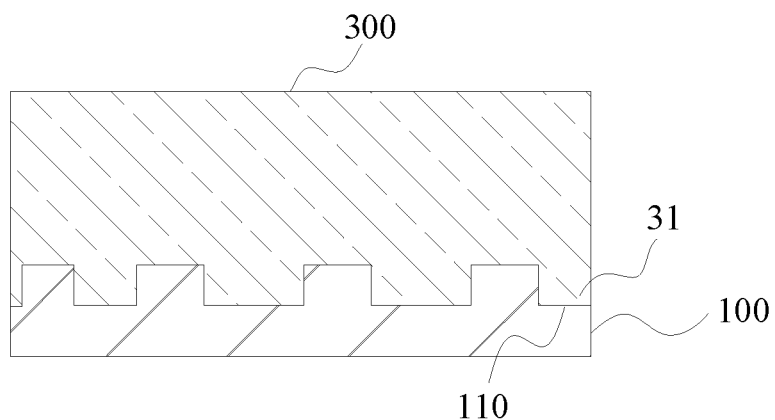
FIG. 4 shows a vertical view of the area A in FIG. 3.

According to an embodiment of the present disclosure, the specific manner in which the reflection plate 300 is fixed in the mold frame 100 is not particularly limited as long as the fixation of the reflection plate 300 can be achieved. For example, referring to FIG. 4, the inner side wall of the mold frame 100 may be provided with an engaging portion 110, and the reflection plate 300 is engaged with the engaging portion 110. Thereby, the reflection plate can be easily engaged with the mold frame structure without bonding by an adhesive. According to an embodiment of the present disclosure, the engaging portion 110 includes a plurality of latching slots, and the reflection plate 300 has a plurality of protruding portions 31 that cooperate with the latching slots, and each of the protruding portions 31 is engaged in a corresponding latching slot. Thereby, the engagement of the reflection plate 300 and the mold frame 100 is more matched. Thus, the reflection plate 300 is stacked on the heat sinking plate 200 only by engagement, and is not closely bonded. When the temperature changes, inconsistency in expansion/contraction between the heat sinking plate 200 and the reflection plate 300 will not cause warping of the reflection plate 300. Optical defects such as wrinkles and Newton's rings caused by warping are avoided. On the other hand, the total thickness of the backlight module having the above structure is the sum of the thickness of the box-shaped structure and the thickness of the heat sinking plate 200. Comparing with adding a heat sinking plate 200 in the conventional backlight module, the thickness of the backlight module is reduced by the thickness of the adhesive layer and the reflection plate.

Figure 5:
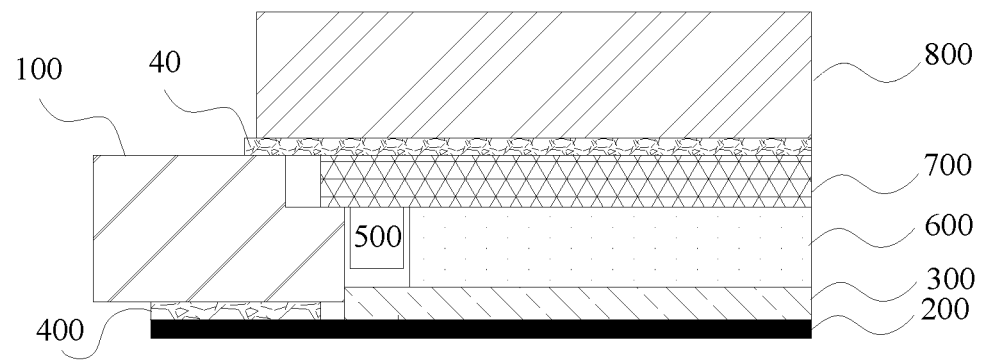
FIG. 5 is a schematic structural diagram of a backlight module according to an embodiment of the present disclosure.

According to an embodiment of the present disclosure, referring to FIG. 5, the backlight module further includes a light source 500. According to an embodiment of the present disclosure, the light source 500 is disposed in the box-shaped structure and located on a side of the reflection plate 300 away from the heat sinking plate 200. Thereby, the performance of the backlight module can be further improved. According to an embodiment of the present disclosure, the orthographic projection of the light source 500 on the heat sinking plate 200 is located within the orthographic projection of the reflection plate 300 on the heat sinking plate. Thereby, the light emitted by the light source 500 can be better reflected by the reflection plate 300 to improve the backlight brightness of the backlight module. According to an embodiment of the present disclosure, there is a gap between the light source 500 and the reflection plate 300. Thereby, overheating at the light source 500 can be prevented.

In another aspect of the present disclosure, the present disclosure proposes a display device. According to an embodiment of the present disclosure, the display device includes the backlight module described above. Therefore, the display device can have all the features and advantages of the backlight module described above, and details are not described herein again. In general, the display device has at least one of the following advantages: the heat sinking plate is not bonded to the reflection plate, the warping of the reflection sheet is avoided, and the optical defects such as wrinkles and Newton rings are prevented; the reflection plate is disposed in the box-shaped structure, the thickness of the display device can be reduced, and becomes lighter and thinner; and the box-shaped structure can be used as an integral support structure of the display device.

In the description of the present disclosure, the orientation or positional relationship of the terms "upper", "lower" and the like is based on the orientation or positional relationship shown in the drawings, and is merely for the convenience of describing the present disclosure and does not require that the present disclosure must be configured and operated with specific orientations, therefore not to be construed as limiting the present disclosure.

In the description of the present specification, the description of the terms "one embodiment", "another embodiment" or the like means that the specific features, structures, materials or characteristics described in connection with the embodiments are included in at least one embodiment of the present disclosure. In the present specification, the above terms is not necessarily directed to the same embodiment or example. Furthermore, the particular features, structures, materials, or characteristics described may be combined in a suitable manner in any one or more embodiments or examples. In addition, various embodiments or examples described in the specification and features of various embodiments or examples may be combined in case there is no contradiction therebetween. In addition, it should be noted that in the present specification, the terms "first" and "second" are used for descriptive purposes only, and are not to be construed as indicating or implying a relative importance or implicitly indicating the number of technical features indicated.

While the embodiments of the present disclosure have been shown and described above, it is understood that the foregoing embodiments are illustrative and are not to be construed as limiting the scope of the present disclosure. The embodiments are subject to variations, modifications, substitutions and changes.

What is claimed is:

1. A backlight module comprising:
   a heat sinking plate;
   a mold frame which is fixed to the heat sinking plate and surrounds a region on the heat sinking plate; and
   a reflection plate disposed in the region surrounded by the mold frame such that the reflection plate can move relative to the heat sinking plate,
   wherein the reflection plate does not extend under the mold frame.

2. The backlight module of claim 1, wherein there is no adhesive between the heat sinking plate and the reflection plate.

3. The backlight module of claim 1, wherein the heat sinking plate is made of natural graphite, synthetic graphite, copper foil, aluminum foil or a thermally conductive silicone film.

4. The backlight module of claim 1, wherein an inner side wall of the mold frame is provided with an engaging portion, and the reflection plate is engaged with the engaging portion.

5. The backlight module of claim 4, wherein a snap portion comprises a plurality of latching slots, and the reflection plate comprises a plurality of protruding portions, and each of the plurality of protruding portions is engaged with a corresponding latching slot.

6. The backlight module of claim 1, wherein a bottom surface of the mold frame is provided with an adhesive layer, and the heat sinking plate is fixed to the mold frame by the adhesive layer.

7. The backlight module of claim 6, wherein a width of the adhesive layer is no greater than a width of the bottom surface of the mold frame.

8. The backlight module of claim 6, wherein the adhesive layer is a double-sided tape of a rectangular shape.

9. The backlight module of claim 1, further comprising
   a light source disposed on a side of the reflection plate away from the heat sinking plate.

10. The backlight module of claim 9, wherein an orthographic projection of the light source on the heat sinking plate is located within an orthographic projection of the reflection plate on the heat sinking plate.

11. The backlight module of claim 9, wherein there is a gap between the light source and the reflection plate.

12. The backlight module of claim 9, further comprising:
    a light guide plate on a side of the reflection plate away from the heat sinking plate.

13. The backlight module of claim 12, further comprising
    an optical film layer located on a side of the light guide plate away from the reflection plate.

14. The backlight module of claim 1, wherein the heat sinking plate is directly bonded to the mold frame.

15. A display device comprising the backlight module according to claim 1.

* * * * *

UNITED STATES PATENT AND TRADEMARK OFFICE
CERTIFICATE OF CORRECTION

PATENT NO. : 11,294,229 B2
APPLICATION NO. : 16/333881
DATED : April 5, 2022
INVENTOR(S) : Hongliang Lyu et al.

It is certified that error appears in the above-identified patent and that said Letters Patent is hereby corrected as shown below:

On the Title Page

Column 1, item (71), Applicants, Line 1, delete "OPTOELETRONICS" and insert
-- OPTOELECTRONICS --

Column 1, item (73), Assignees, Line 2, delete "Technologyy" and insert -- Technology --

Signed and Sealed this
Thirty-first Day of May, 2022

Katherine Kelly Vidal
*Director of the United States Patent and Trademark Office*